United States Patent [19]
Pollet et al.

[11] 3,947,273
[45] Mar. 30, 1976

[54] DEVELOPMENT MODIFIERS FOR SILVER HALIDE EMULSIONS

[75] Inventors: Robert Joseph Pollet, Vremde; Herman Adelbert Philippaerts, Edegem; Francis Jeanne Sels, Kontich; Francois Leon Schelfaut, St. Niklaas, all of Belgium

[73] Assignee: AGFA-GEVAERT, N.V., Mortsel, Belgium

[22] Filed: Apr. 29, 1974

[21] Appl. No.: 465,370

[30] Foreign Application Priority Data
June 1, 1973 United Kingdom............... 26250/73

[52] U.S. Cl.................. 96/66.3; 96/95; 96/114
[51] Int. Cl.² ... G03C 5/30; G03C 1/06; G03C 1/72
[58] Field of Search............ 96/66 R, 66.3, 114, 95, 96/107

[56] References Cited
UNITED STATES PATENTS

| | | | |
|---|---|---|---|
| 2,531,832 | 11/1950 | Stanton............................... | 96/66 R |
| 3,615,519 | 10/1971 | Milton................................. | 96/66 R |
| 3,622,330 | 11/1971 | Valiaveedan...................... | 96/66 R |
| 3,666,475 | 5/1972 | Douglas.............................. | 96/114 |
| 3,817,753 | 6/1974 | Willems et al..................... | 96/66.3 |
| 3,832,180 | 8/1974 | Douglas.............................. | 96/66.3 |

*Primary Examiner*—Mary F. Kelley
*Attorney, Agent, or Firm*—A. W. Breiner

[57] ABSTRACT

A process is described of improving the development characteristics of photographic silver halide elements by the use of compounds corresponding to the formula:

$$RO(CH_2CH_2O)_n(CO)_mA$$

wherein:
R represents hydrogen, $C_1$–$C_5$ alkyl or $(-CO)_m-A$,
$n$ is an integer of at least 4,
$m$ is 0 or 1, and
A represents, when $m$ is 0, sulphoalkyl, carboxyalkyl, or sulphoalkoxycarbonylalkyl, and when $m$ is 1, carboxyalkyl, sulphoalkoxycarbonylalkyl, carboxyalkenyl, sulphoalkoxycarbonylalkenyl, carboxyphenyl, sulphoalkoxycarbonylphenyl or sulphophenyl, the aliphatic hydrocarbon groups having at most 4 C-atoms and the carboxyl and sulpho groups being in acid or salt form. The polyethylene glycol derivatives increase developability and sensitivity of black-and-white as well as colour emulsions. They also improve lith-development of photographic "lith"-emulsions.

24 Claims, No Drawings

DEVELOPMENT MODIFIERS FOR SILVER HALIDE EMULSIONS

The present invention relates to a process for producing photographic silver images by development of exposed light-sensitive silver halide in the presence of compounds improving the development characteristics. It further relates to photographic silver halide elements and developing solutions containing such compounds.

It is known that development of exposed silver halide elements to form continuous tone images by means of common developers e.g. a hydroquinone/p-methylaminophenol developer can be accelerated by the use in the photographic element or the developing bath of polyoxyalkylene compounds.

It is also known that polyoxyalkylene compounds when used with so-called lith-developers (infectious development which are generally developers comprising hydroquinone as the sole developing substance and a low sulphite content usually in the form of a bisulphite-addition product of an aliphatic aldehyde or ketone e.g. formaldehyde bisulphite, restrain the development rate while increasing the gradation. These polyoxyalkylene compounds are therefore very suitable in the lith-development of silver halide emulsions of the graphic arts type i.e. of the type used for photomechanical reproduction of line or half-tone images which are generally silver chloride and silver bromochloride emulsions comprising at most 50 mole %; preferably at most 30 mole % of bromide.

A wide variety of polyoxyalkylene compounds have been proposed for improving the development characteristics of common photographic black-and-white as well as colour elements and of lith-type materials, e.g. polyethylene glycols, preferably having a molecular weight of at least 1500 as well as derivatives thereof e.g. ethers and esters thereof obtained by reaction with fatty alcohols, alkylphenols, and fatty acids, polyesters obtained by polycondensation of dibasic acids with polyethylene glycols, etc.

Many of these polyoxyalkylene compounds, however, when used in silver halide emulsion layers, impair the keeping qualities of these layers, particularly at high temperatures and elevated degrees of relative humidities in that they induce a substantial increase of fog. It also often occurs that they impair the image-tone of the developed silver by forming brown or reddish-brown images. Moreover, when used in infectious development they often increase the formation of "peppers", do not lead to favourable dot-quality or do not allow sufficient development latitude.

Peppers are black spots of a very high density which are irregularly produced during the development in the areas of the light-sensitive emulsion which are slightly exposed. These peppers when they are present in high extent markedly degrade quality of the halftone image reproduction by deforming the screen dots and/or soiling the areas which are practically not exposed. The phenomenon of peppers particularly arises when partly oxidized or somewhat exhausted developers are used.

It has now been found that derivatives of polyethylene glycols or mono-$C_1$–$C_5$ alkyl ethers thereof which can be represented by the following general formula:

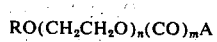

RO(CH$_2$CH$_2$O)$_n$(CO)$_m$A wherein:

R represents hydrogen, $C_1$–$C_5$ alkyl e.g. methyl or (—CO)$_m$—A, n is an integer of at least 4, preferably at least 10, m is 0 or 1, and A represents, when m is 0, sulphoalkyl, e.g. 3-sulphopropyl and 2-hydroxy-3-sulphopropyl, carboxyalkyl, e.g. carboxymethyl, or sulphoalkoxycarbonylalkyl, and when m is 1 carboxyalkyl e.g. carboxyethyl and 1-sulpho-2-carboxyethyl, sulphoalkoxycarbonylalkyl, carboxyalkenyl, e.g. 2-carboxyvinyl, sulphoalkoxycarbonylalkenyl, carboxyphenyl, sulphoalkoxycarbonylphenyl or sulphophenyl, the aliphatic hydrocarbon groups having at most 4C-atoms and the carboxyl and sulpho groups being in acid or salt form e.g. potassium salt, ammonium salt, diethanol ammonium salt, triethanolammonium salt and morpholinium salt, have favourable effects on the development of common photographic silver halide elements as well as lith-elements.

The developability and sensitivity of common photographic black-and-white or colour emulsions can be substantially increased, without impairing the keeping qualities of the emulsions to a noteworthy extent, by carrying out development in the presence of the above polyoxyethylene derivatives, especially derivatives wherein n is an integer of at least 10.

Moreover, the development of line and/or halftone images in lith-emulsions by means of lith-developers as described above, in the presence of the above polyethylene oxide compounds produces very contrasty silver images, yields very sharply defined screen dots, occurs with the formation of very few peppers and/or can take place within a broad interval of time without harm to the image quality.

The present invention therefore provides a process of developing photographic materials comprising exposed silver halide wherein development is carried out in the presence of polyethylene oxide compounds corresponding to the above formula.

The invention further provides photographic light-sensitive silver halide elements and photographic developing compositions comprising a polyethylene oxide compound corresponding to the above formula.

The polyethylene oxide compounds corresponding to the above formula can be prepared as is illustrated in the preparations hereinafter, by partial or complete conversion of terminal hydroxyl groups of a polyethylene glycol or mono-$C_1$–$C_5$ alkyl ether thereof. Many of these polyglycols and monoethers thereof are commercially available generally in the form of mixtures of varying molecular weight. The polyoxyethylene compounds used to prepare the derivatives of the invention have an average molecular weight of at least 200.

The terminal hydroxyl group(s) can be converted by reaction with an anhydride of a dibasic saturated or unsaturated acid e.g. succinic anhydride, maleic anhydride, phthalic anhydride and sulphobenzoic anhydride, with a sultone e.g. propane sultone, with an α-halo- or β-halo-carboxylic acid e.g. α-chloro-acetic acid or with an epoxyalkane sulphonic acid e.g. 1,2-epoxy propane sulphonic acid. Terminal carboxyl groups of the compounds thus formed can be further esterified with a sultone e.g. propane sultone to form a terminal sulphoalkyl ester group. The reaction products obtained by reaction with an anhydride of an unsaturated dibasic acid e.g. maleic anhydride can further be allowed to react with a bisulphite thus forming a bisulphite addition product.

Representative examples of polyoxyethylene compounds according to the present invention, which can be prepared according to the above procedures and as illustrated hereinafter are:

 1.

wherein $n$ is about 4, about 22 or about 34 derived from polyethylene glycol of average molecular weight 200, 1000 or 1500 respectively; these compounds can be prepared as follows:

A solution of 150 g of polyethylene glycol (average molecular weight 1500), 44 g of o-sulphobenzoic anhydride and 16.3 g of anhydrous pyridine in 400 ml of anhydrous benzene was refluxed with stirring for 8 hours. The solution was treated with a solution of 11.6 g of sodium carbonate in 150 ml of water. The mixture was concentrated by evaporation and the residue was dissolved in ethanol. The solution was filtered and again concentrated until dry by evaporation. Yield : 164 g.

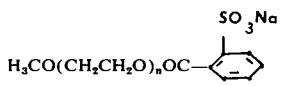 2.

wherein $n$ is about 16 derived from polyethylene glycol monomethyl ether of average molecular weight 750; this compound was prepared in the same way as the above compounds from equimolar amounts of o-sulphobenzoic anhydride and polyethylene glycol monomethyl ether.

HOOC—CH=CH—COO(CH$_2$CH$_2$O)$_n$CO—CH=
CH—COOH        (3)

wherein $n$ is about 4, about 22, about 34, about 45 or about 90 derived from polyethylene glycol of average molecular weight 200, 1000, 1500, 2000, or 4000 respectively; these compounds can be prepared as follows:

A solution of 100 g of polyethylene glycol (molecular weight 1000) and 19.6 g of maleic anhydride in 1000 ml of anhydrous toluene was refluxed for 7 hours. The solution obtained was concentrated until dry by evaporation.

Yield : 116 g.

HOOC—CH$_2$—CH$_2$—COO(CH$_2$CH$_2$O)$_n$CO—CH$_2$—CH$_2$—COOH        (4)

wherein $n$ is about 34 derived from polyethylene glycol of average molecular weight 1500 and succinic anhydride; the compound was prepared according to the procedure used for the preparation of compound 3.

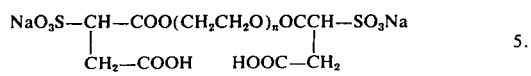 5.

wherein $n$ is about 4 or about 22 derived from polyethylene glycol of average molecular weight 200 or 1000, respectively; these compounds can be prepared as follows :

A solution of 79.2 g of the above polyethylene glycol maleic acid diester with $n$ being about 4 in 200 ml of water and 38 g of sodium metabisulphite in 100 ml of water, was refluxed with stirring for 3 hours. The solution was filtered over charcoal while hot and then concentrated till dry by evaporation.

Yield : 105 g.

NaO$_3$S—(CH$_2$)$_3$O—(CH$_2$CH$_2$O)$_n$(CH$_2$)$_3$SO$_3$Na        (6)

wherein $n$ is about 4, about 22 or about 34 derived from polyethylene glycol of average molecular weight 200, 1000 or 1500 respectively; these compounds can be prepared as follows:

A mixture of 100 g of anhydrous polyethylene glycol (average molecular weight 200), 122 g of propane sultone and 53 g of sodium carbonate was heated to 130°C for 8 hours. The solid product obtained was taken up in 2.5 liters of anhydrous methanol, filtered and concentrated by evaporation until dry. The residue was washed with ethyl acetate, taken up again in 2.5 liters of anhydrousmethanol and precipitated by means of 2.5 liters of isopropanol. The solid was filtered off and dried.

Yield : 70 g.

In the preparation of the polyethylene glycol derivatives wherein $n$ is about 22 or about 34 the anhydrous methanol was replaced by a mixture of ethanol and isopropanol.

HO(CH$_2$CH$_2$O)$_n$(CH$_2$)$_3$SO$_3$Na        (7)

wherein $n$ is about 4 derived from polyethylene glycol of average molecular weight 200 was obtained by concentrating the methanol/isopropanol filtrate of the foregoing preparation until dry.

Yield : 40 g.

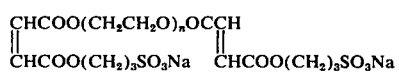 8.

wherein $n$ is about 4 derived from polyethylene glycol of average molecular weight 200; this compound can be prepared as follows.

A solution of 39.6 g of the compound 3 wherein $n$ is about 4, 4.6 g of sodium and 24.4 g of propane sultone in 350 ml of anhydrous methanol was refluxed for 1 hour, filtered while hot and cooled. The precipitate formed by addition of 2 liters of ether was filtered off by suction and dried.

Yield : 43 g.

The compounds used according to the present invention can be added to the coating composition of a silver halide emulsion layer and/or incorporated into a water-permeable layer which when coated under or on top of the emulsion layer forms a water-permeable system with the silver halide emulsion layer and is then in effective contact with the silver halide. It is also possible to incorporate the compounds in the developer;

when intended for use in the developer it is preferred to use compounds of the above formula wherein $m = 0$.

The compounds of use according to the invention can be incorporated into the coated emulsion layer either by treating the emulsion layer with an aqueous solution of these compounds or by coating this layer with a water-permeable layer containing the said compounds, or also by bringing the said compounds from a water-permeable layer lying under the emulsion layer and comprising said compounds by diffusion into effective contact with the silver halide.

The water-soluble compounds of the invention can be added to the light-sensitive silver halide emulsion during different preparation steps of the light-sensitive material: for instance they can be incorporated therein as a separate addition either mixed with one or more ingredients, which are used in the preparation of the silver halide grains during the physical or chemical ripening process, or another moment preceding coating of the emulsion.

The compounds of the invention are preferably added to the silver halide emulsion composition after the chemical ripening process and just before coating the emulsion.

The compounds are preferably added from a solution in water or in an aqueous mixture of water and water-miscible organic solvents such as ethanol that do not impair the photographic properties of the light-sensitive silver halide emulsion.

The step of influencing the sensitometric characteristics of silver halide emulsions by means of the compounds of the invention can be combined with a method known as chemical sensitization, in which together with the above-mentioned compounds chemical sensitizers are used, e.g., sulphur-containing compounds such as allyl isothiocyanate, allylthiourea or sodium thiosulphate, reducing compounds such as the tin compounds described in the Belgian Patent No. 493,464 filed Jan. 24, 1950 and No. 568,687 filed June 18, 1958 both by Gevaert Photo-Producten N.V., the iminoaminomethane sulphinic acid compounds described in the British Patent No. 789,823 filed Apr. 29, 1955 by Gevaert Photo-Producten N.V., or noble metal compounds such as gold, platinum, palladium, iridium, ruthenium, and rhodium compounds as described by R. Koslowsky, Z. Wiss. Phot. 46, 65–72 (1951).

The compounds employed in the present invention can also be used in combination with stabilizers and fog-inhibiting compounds for the silver halide emulsion, for instance with mercury compounds such as those described in Belgian Patent No. 524,121 filed Nov. 7, 1953 by Kodak Ltd. and No. 677,337 filed Mar. 4, 1966 by Gevaert Photo-Producten N.V. and in published Dutch Patent Application No. 6715932 filed Nov. 23, 1967 by Gevaert-Afga N.V., with organic sulphur-containing compounds that form an insoluble silver salt with silver ions, with heterocyclic nitrogen-containing thioxo compounds such as benzothiazoline-2-thione and 1-phenyl-2-tetrazoline-5-thione, the compounds described in the Belgian Patents Nos. 571,916 and 571,917 both filed Oct. 10, 1958 by Gevaert Photo-Producten N.V., and tetra- or pentaazaindenes especially those substituted by hydroxyl or amino groups. Examples of the latter compounds have been described by Birr, Z.Wiss.Phot. 47, 2–58 (1952). The combination with sensitizing and stabilizing cadmium salts such as cadmium chloride in the light-sensitive material as well as in the developing bath can also be applied.

In addition to the above stabilizing and chemical sensitizing agents other compounds, e.g. organic onium compounds and polyonium compounds, preferably of the ammonium or sulphonium type e.g. quaternary tetra-alkylammonium salts, alkylpyridinium salts, bis-alkylene-pyridinium salts, alkyl-quinolinine salts, trialkyl-sulphonium salts, onium derivatives of amino-N-oxides as described in British Patent No. 1,121,696 filed Oct. 7, 1965 by Gevaert-Agfa N.V. and iodonium compounds for instance diphenyl iodonium chloride as described in British Patent No. 1,119,075 filed Oct. 7, 1965 by Gevaert-Afga N.V. can be used together with the compounds according to the invention in the developing solution as well as in the light-sensitive material. Other ingredients, such as spectral sensitizers, colour couplers, developing substances, hardening agents, plasticizers, and wetting agents, can also be added to the emulsion in the ordinary way.

The development of low-sensitive as well as of high-sensitive, of fine-grain as well as of coarse-grain silver halide emulsions is accelerated by the action of the above-mentioned compounds. The compounds can be applied for accelerating the development of X-ray emulsions as well as of a wide range of spectrally or non-spectrally sensitized emulsions. They can be incorporated into the photographic emulsion either with or without spectral sensitizers and can be used for increasing the sensitivity of negative emulsions as well as of positive emulsions.

The optimum amount of polyoxyethylene compound to be used for accelerating development of exposed silver halide emulsions depends on the nature of the colloid binding agent, on the amount and kind of silver halide in the emulsion, on the developing composition used and on the specific compound itself. This amount can vary between very wide limits and can easily be determined by some simple tests known to those skilled in the art. Generally, the compounds are used in the light-sensitive material in amounts ranging from about 10 mg to about 5 g per mole of silver halide. In the developing bath, they are normally used in amounts ranging from about 10 mg to about 5 g per liter.

The silver halide emulsions may comprise different types of silver halide e.g. silver bromide, silver chloride, silver chlorobromide, silver bromoiodide and silver chlorobromoiodide.

The silver halides are dispersed in hydrophilic colloid materials which include besides gelatin, which is preferred, collodion, gum arabic, casein, zein, cellulose ester derivatives such as alkyl esters of carboxylated cellulose, hydroxyethyl cellulose, carboxymethyl hydroxyethyl cellulose, alginic acid, polyvinyl alcohol and other synthetic resins well known in the art.

The silver halide emulsions may be coated on a wide variety of supports. Typical supports are cellulose nitrate film, cellulose ester film, polyvinyl acetal film, polystyrene film, poly(ethylene terephthalate) film, and related films of resinous materials, as well as glass, paper, metal and the like.

Supports such as paper, which are coated with $\alpha$-olefin polymers, particularly polymers of $\alpha$-olefins containing two or more carbon atoms, as exemplified by polyethylene, polypropylene, ethylene-butylene copolymers and the like can also be employed.

As noted above, the polyoxyethylene compounds are also particularly suitable for use in the development of lith-type photographic elements for reproducing line and half-tone images, the compounds being present in the photographic element or in the developer. In lith development, the polyoxyethylene compounds of the invention are generally used in amounts ranging from about 1 mg to about 2000 mg, preferably from about 10 mg to about 1000 mg per mole of silver halide or per liter of developer.

The lith-type elements comprise a silver halide emulsion layer containing at least about 50 mole %, preferably at least about 70 mole % of silver chloride, at least about 5 mole % of silver bromide and from 0 to about 5 mole % of silver iodide.

The average grain diameter is preferably comprised between about 0.1 and about 0.4 μm.

Development of these lith-materials generally occurs in developers comprising hydroquinone as the sole developing substance and formaldehyde bisulphite keeping the sulphite content low. However, these lith-materials can also be developed in special lith developers as described in the published German Patent Application No. 2,206,299 filed Feb. 10, 1972 by Agfa-Gevaert A.G. which comprise hydroquinone as the sole developing agent, at least 5 g/liter of sulphite and a nitroindazole or nitrobenzimidazole as development restrainer. Another suitable development restrainer for use in the development of lith emulsions is 1H-6-methyl-benzotriazole. Of course, lith-emulsions can also be developed in other contrasty developers e.g. N-methyl-p-aminophenol/hydroquinone developers.

The polyoxyethylene compounds of the present invention can also be used in the lith-system of the published German Patent Application No. 2,324,161 filed May 12, 1973 by Agfa-Gevaert A.G. according to which high contrast images are produced by exposure and development of a photographic lith-type silver halide element comprising a support and a lith-type emulsion as described above wherein the element incorporates hydroquinone as developing agent, and development is effected by treatment of the exposed element with an alkaline development activator in the presence of hydroxylamine or a salt thereof or of a N-mono-substituted hydroxylamine or a salt thereof.

The binding agents of lith-emulsions may contain dispersed polymerized vinyl compounds e.g. as described in the U.S. Pat. No. 3,142,568 of Robert William Nottorf issued July 28, 1964, U.S. Pat. No. 3,193,386 of Clayton F.A. White issued July 6, 1965, U.S. Pat. No. 3,062,674 of Robert C. Houck, Donald A. Smith and Joseph S. Yudelson issued Nov. 6, 1962, U.S. Pat. No. 3,220,844 of Kenneth J. Huber Jack F. Johnston, Eduard K. Nissen and De Witt R. Pourie issued Nov. 30, 1965 and U.S. Pat. No. 3,518,085 of Kirby M. Milton and Charles A. Goffe issued June 30, 1970. They include the water-insoluble polymers of alkyl acrylates and methacrylates, acrylic acid, sulfoalkyl acrylates or methacrylates, interpolymers of alkyl acrylates with acrylic acids, acryloyloxyalkylsulphonic acids, acetoacetoxyalkyl acrylates such as 2-acetoacetoxyethyl methacrylate and the like. These compounds may be incorporated likewise into a separate layer of the photographic element. The vinyl polymers may be employed in concentrations of about 20 to about 80 %, most often concentrations of at least 50 % by weight, based on the weight of the binding agent.

Silver halide emulsions wherein the binding agent contains a dispersed polymerised vinyl compound provide particularly good results in eliminating drag streaks and dot distortions.

The lith-type emulsion layer and/or other hydrophilic colloid layers of the photographic lith element may also contain conventional addenda as referred to above, stabilizers and antifoggants, e.g. cadmium compounds 5-methyl-7-hydroxy-s-triazolo[1,5-a]pyrimidine and 2,2'-tetramethylene bis-tetrazole, hardening agents, plasticizers, coating aids, etc.

The lith-type emulsions may be chemically sensitized by means described hereinbefore.

The lith-type emulsions may be used without being spectrally sensitized, however, it is advantageous to spectrally sensitize them according to methods well known in the art to make them ortho-sensitized or panchromatically sensitized. Spectral sensitizers that can be used are e.g. the cyanines, merocyanines, complex (trinuclear) cyanines, complex (trinuclear) merocyanines, styryl dyes, oxonol dyes and the like. Suchlike spectrally sensitizing dyes have been described by F. M. Hamer in "The cyanine dyes and related compounds" (1964). Especially suitable are the cyanines and merocyanines described in French Patent No. 1,073,968 filed Oct. 22, 1952 by Farbenfabriken Bayer, No. 2,075,675 filed Jan. 15, 1971, No. 2,080,479 filed Jan. 28, 1971 and No. 2,080,480 filed Jan. 28, 1971 all by Gevaert-Agfa N.V., British Patent No. 654,683 filed Feb. 24, 1948 by Kodak Ltd. and No. 1,090,626 filed Oct. 11, 1965 by Agfa A.G. and Belgian Patent No. 654,816 filed Oct. 26, 1964 by Agfa A.G., No. 701,921 filed July 27, 1967 and No. 716,831 filed June 19, 1968 both by Konishiroku Photo Industrie and No. 723,720 filed Dec. 12, 1968 by Kodak Ltd.

Typical examples of suitable spectrally sensitizing dyes are:

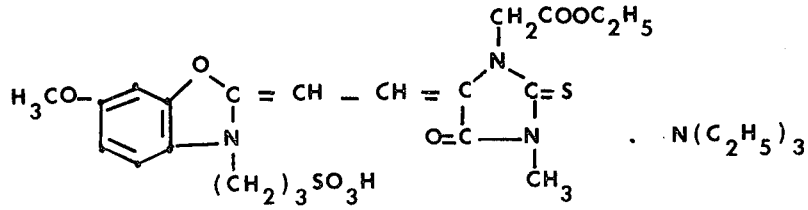

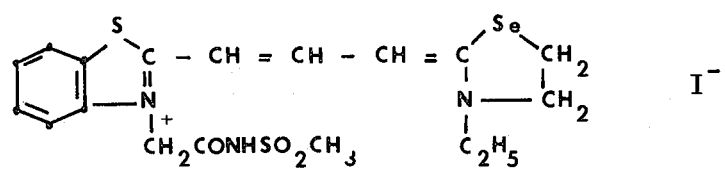

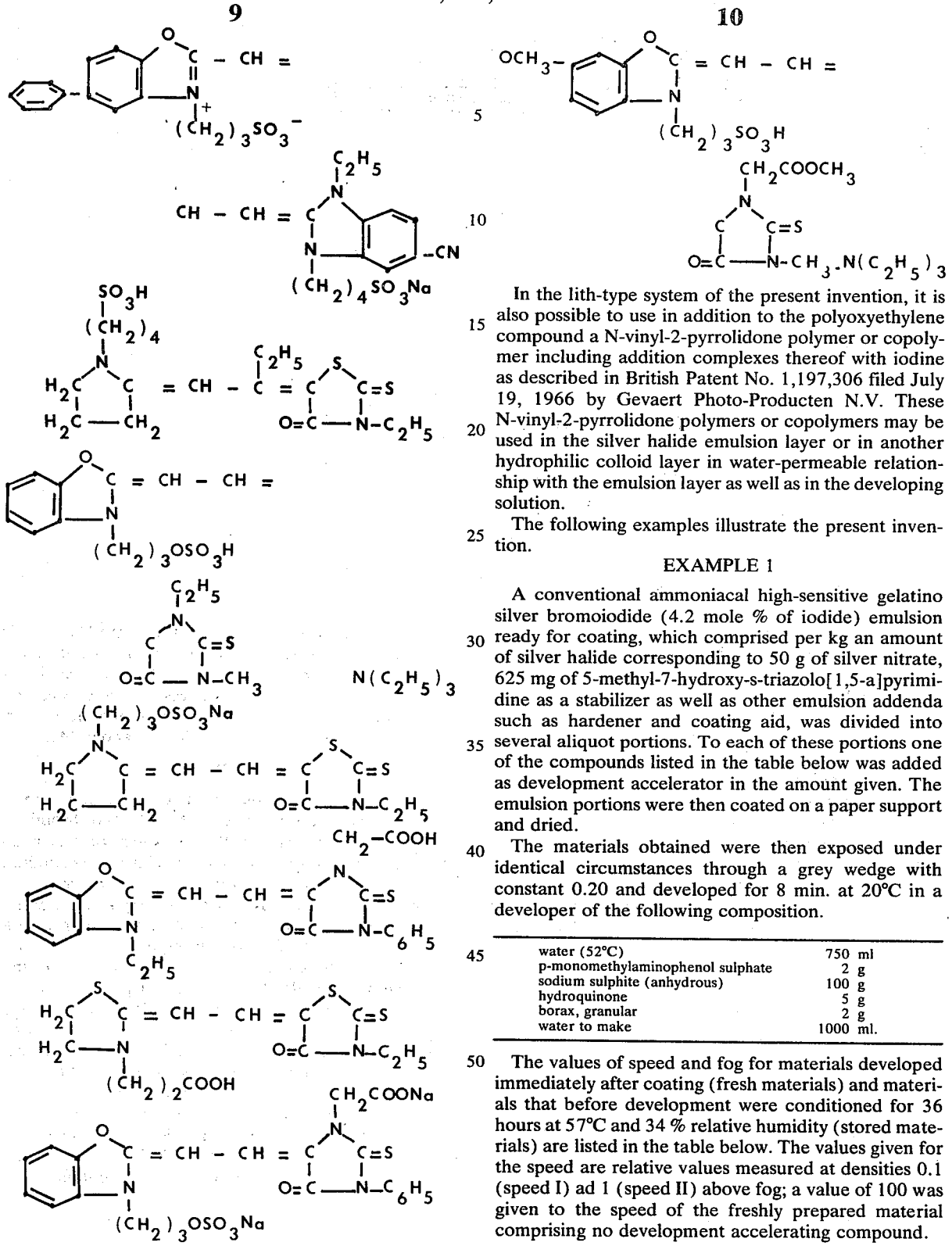

In the lith-type system of the present invention, it is also possible to use in addition to the polyoxyethylene compound a N-vinyl-2-pyrrolidone polymer or copolymer including addition complexes thereof with iodine as described in British Patent No. 1,197,306 filed July 19, 1966 by Gevaert Photo-Producten N.V. These N-vinyl-2-pyrrolidone polymers or copolymers may be used in the silver halide emulsion layer or in another hydrophilic colloid layer in water-permeable relationship with the emulsion layer as well as in the developing solution.

The following examples illustrate the present invention.

EXAMPLE 1

A conventional ammoniacal high-sensitive gelatino silver bromoiodide (4.2 mole % of iodide) emulsion ready for coating, which comprised per kg an amount of silver halide corresponding to 50 g of silver nitrate, 625 mg of 5-methyl-7-hydroxy-s-triazolo[1,5-a]pyrimidine as a stabilizer as well as other emulsion addenda such as hardener and coating aid, was divided into several aliquot portions. To each of these portions one of the compounds listed in the table below was added as development accelerator in the amount given. The emulsion portions were then coated on a paper support and dried.

The materials obtained were then exposed under identical circumstances through a grey wedge with constant 0.20 and developed for 8 min. at 20°C in a developer of the following composition.

| | |
|---|---|
| water (52°C) | 750 ml |
| p-monomethylaminophenol sulphate | 2 g |
| sodium sulphite (anhydrous) | 100 g |
| hydroquinone | 5 g |
| borax, granular | 2 g |
| water to make | 1000 ml. |

The values of speed and fog for materials developed immediately after coating (fresh materials) and materials that before development were conditioned for 36 hours at 57°C and 34 % relative humidity (stored materials) are listed in the table below. The values given for the speed are relative values measured at densities 0.1 (speed I) ad 1 (speed II) above fog; a value of 100 was given to the speed of the freshly prepared material comprising no development accelerating compound.

Table

| Compound added per kg | Fresh materials | | | Stored materials | | |
|---|---|---|---|---|---|---|
| | Fog | Speed I | Speed II | Fog | Speed I | Speed II |
| — | 0.08 | 100 | 100 | 0.11 | 105 | 87 |
| 100 mg of polyethylene glycol of average molecular weight 6000 | 0.16 | 151 | 240 | 0.60 | 60 | — |
| 300 mg of compound 3 (n = about 34) | 0.09 | 126 | 145 | 0.15 | 145 | 110 |
| 1000 mg of compound 3 | | | | | | |

Table-continued

| Compound added per kg | Fresh materials | | | Stored materials | | |
|---|---|---|---|---|---|---|
| | Fog | Speed I | Speed II | Fog | Speed I | Speed II |
| (n = about 34) | 0.11 | 158 | 200 | 0.19 | 158 | 115 |
| 300 mg of compound 3 (n = about 22) | 0.11 | 151 | 302 | 0.15 | 132 | 182 |
| 1000 mg of compound 3 (n = about 22) | 0.10 | 151 | 200 | 0.18 | 144 | 115 |
| 300 mg of compound 2 (n = about 18) | 0.13 | 120 | 229 | 0.17 | 120 | 158 |
| 1000 mg of compound 2 (n = about 18) | 0.13 | 138 | 263 | 0.18 | 132 | 191 |
| 300 mg of compound 6 (n = about 34) | 0.11 | 120 | 302 | 0.16 | 132 | 288 |
| 1000 mg of compound 6 (n = about 34) | 0.13 | 126 | 525 | 0.20 | 144 | 501 |
| 300 mg of compound 6 (n = about 22) | 0.10 | 100 | 380 | 0.12 | 115 | 363 |
| 1000 mg of compound 6 (n = about 22) | 0.11 | 126 | 479 | 0.16 | 126 | 251 |
| 3000 mg of compound 1 (n = about 34) | 0.11 | 126 | 479 | 0.15 | 83 | 316 |
| 1000 mg of compound 1 (n = about 34) | 0.13 | 126 | 417 | 0.21 | 126 | 263 |

The above results show the favourable speed increasing effect of the compounds of the invention. They do not increase the fog to the same extent as the polyethylene glycol.

EXAMPLE 2

Two identical chemically ripened silver chlorobromoiodide emulsions (0.4 mole % of iodide and 16 mole % of bromide) suitable for the reproduction of line and half-tone images, which contain 5-methyl-7-hydroxy-s-triazolo[1,5-a]pyrimidine, cadmium chloride and diphenyl iodonium chloride, were spectrally sensitized whereupon one of the polyoxyethylene compounds listed in the table below were added in an amount of 25 mg per amount of silver halide corresponding to 100 g of silver nitrate.

After addition of coating aid and hardening agent the emulsions were coated on a support and dried.

The materials were exposed through a continuous wedge and developed in a hydroquinone-formaldehyde bisulphite lith-developer.

The results attained are listed in the table below. A value of 0 to 4 is given to the number of peppers observed, which values should be interpreted as follows:

0 stands for no peppers
1 stands for very few peppers
2 stands for a few peppers
3 stands for a number of peppers still acceptable but less desirable
4 stands for many peppers (poor quality material)
>4 stands for too many peppers (useless material).

The above results shown that the compound of the present invention is superior over polyethylene glycol itself in that less peppers are formed and the gamma is higher. The same favourable results were obtained when repeating the example using compound 6 ($n =$ about 4) instead of compound 3 ($n =$ about 34).

EXAMPLE 3

A spectrally sensitized lith-material comprising a gelatino silver chorobromide (16 mole % of bromide) emulsion layer containing 25 % by weight of latex-plasticizer calculated on the weight of gelatin and cadmium chloride as stabilizer was divided into four strips.

The strips were exposed through a step wedge and a grey negative contact screen and then developed in a hydroquinone/formaldehyde bisulphite lith-developer to which a polyoxyethylene compound as listed in the table below was added in the amount given.

The developed strips showed a dot screen wedge image. The dot definition in the strips was evaluated by comparison with standard materials, which in decreasing order of dot definition quality had the numbers 1, 2, 3, 4, 5, and 6 (1 being excellent and 6 bad).

The dot quality was examined in the areas of each strip that contain 10 % black and 90 % white, and 50 % black and 50 % white, and 90 % black and 10 % white respectively as mentioned in the following table.

| polyoxyethylene compound | peppers | fog | Γ | relative speed |
|---|---|---|---|---|
| polyethylene glycol of average molecular weight 4000 | >4 | 0.01 | 11.19 | 100 |
| compound 3 (n = about 34) | 2 | 0.01 | 12.28 | 110 |

Table

| Compound added per liter | Dot quality at | | |
|---|---|---|---|
| | 10 % black | 50 % black | 90 % black |
| 100 mg of polyethylene glycol of average mol. weight 2000 | 3 | 3 | 3 |
| 400 mg of polyethylene glycol of average mol. weight 2000 | 2-3 | 1-2 | 1-2 |
| 100 mg of compound 3 (n = about 34) | 2-3 | 2 | 2 |
| 400 mg of compound 3 (n = about 34) | 1 | 0-1 | 0-1 |

The above results show that with the compound of the invention better dot quality is obtainable than with polyethylene glycol.

Favourable results were likewise obtained when using instead of compound 3, compound 6 (n= about 22) or compound 6 (n= about 34) which excell by their high stability in the alkaline developer.

We claim:

1. A process for developing a photographic element containing a support and at least one image-wise exposed silver halide emulsion layer in a silver halide developer wherein a polyoxyethylene compound corresponding to the formula:

$$RO(CH_2CH_2O)_n(CO)_mA$$

wherein:
R represents hydrogen, $C_1$-$C_5$ alkyl or $(-CO)_m-A$,
n is an integer of at least 4,
m is 0 or 1, and
A represents, when m is 0, sulphoalkyl, carboxyalkyl, or sulphoalkoxycarbonylalkyl, carbonylalkyl, and when m is 1, carboxyalkyl, sulphoalkoxycarbonylalkyl, carboxyalkenyl, sulphoalkoxycarbonylalkenyl, carboxyphenyl, sulphoalkoxycarbonylphenyl or sulphophenyl,
the aliphatic hydrocarbon groups having at most 4C-atoms and the carboxyl and sulpho groups being in acid or salt form is present at the time of development in said element or in said developer.

2. A process according to claim 1, wherein n is an integer of at least 10.

3. A process according to claim 1, wherein m is 1 and A is carboxyvinyl.

4. A process according to claim 1, wherein m is 1 and A is 2-carboxyethyl or 1-sulpho-2-carboxyethyl.

5. A process according to claim 1, wherein m is 1 and A is carboxyphenyl or sulphophenyl.

6. A process according to claim 1, wherein m is 0 and A is 3-sulphopropyl or 2-hydroxy-3-sulphopropyl.

7. A process according to claim 1, wherein the said silver halide emulsion layer contains at least about 50 mole % of silver chloride, at least about 50 mole % of silver bromide and from 0 to about 5 mole % of silver iodide.

8. A process according to claim 7, wherein said developer includes a hydroquinone-formaldehyde bisulphite developer.

9. A process according to claim 1, wherein the said polyoxyethylene compound is present in the said silver halide emulsion layer.

10. A process according to claim 1, wherein the said polyoxyethylene compound is present in the developer.

11. A photographic light-sensitive silver halide element comprising a support and at least one light-sensitive silver halide emulsion layer wherein the said emulsion layer or a water-permeable layer adjacent thereto contains a polyoxyethylene compound of the formula:

$$RO(CH_2CH_2O)_n(CO)_mA$$

wherein:
R represents hydrogen, $C_1$-$C_5$ alkyl or $(-CO)_m$-A,
n is an integer of at least 4,
m is 0 or 1, and
A represents, when m is 0, sulphoalkyl, carboxyalkyl, or sulphoalkoxycarbonylalkyl, and when m is 1, carboxyalkyl, sulphoalkoxycarbonylalkyl, carboxyalkenyl, sulphoalkoxycarbonylalkenyl, carboxyphenyl, sulphoalkoxycarbonylphenyl or sulphophenyl,
the aliphatic hydrocarbon groups having at most 4C-atoms and the carboxyl and sulpho groups being in acid or salt form.

12. A photographic element according to claim 11, wherein n is an integer of at least 10.

13. A photographic element according to claim 11, wherein m is 1 and A is carboxyvinyl.

14. A photographic element according to claim 11, wherein m is 1 and A is 2-carboxyethyl or 1-sulpho-2-carboxyethyl.

15. A photographic element according to claim 11, wherein m is 1 and A is carboxyphenyl or sulphophenyl.

16. A photographic element according to claim 11, wherein m is 0 and A is 3-sulphopropyl or 2-hydroxy-3-sulphopropyl.

17. A photographic element according to claim 11, wherein the said silver halide emulsion layer contains at least about 50 mole % of silver chloride, at least about 5 mole % of silver bromide and from 0 to about 5 mole % of silver iodide.

18. A photographic developing composition comprising a silver halide developing agent and a polyoxyethylene compound corresponding to the formula:

$$RO(CH_2CH_2O)_n(CO)_mA$$

wherein:
R represents hydrogen, $C_1$-$C_5$ alkyl or $(-CO)_m-A$,
n is an integer of at least 4,
m is 0 or 1, and
A represents, when m is 0, sulphoalkyl, carboxyalkyl, or sulphoalkoxycarbonylalkyl, and when m is 1, carboxyalkyl, sulphoalkoxycarbonylalkyl, carboxyalkenyl, sulphoalkoxycarbonylalkenyl, carboxyphenyl, sulphoalkoxycarbonylphenyl or sulphophenyl,
the aliphatic hydrocarbon groups having at most 4C-atoms and the carboxyl and sulpho groups being in acid or salt form.

19. A photographic developing composition according to claim 18, wherein n is an integer of at least 10.

20. A photographic developing composition according to claim 18, wherein m is 1 and A is carboxyvinyl.

21. A photographic developing composition according to claim 18, wherein m is 1 and A is 2-carboxyethyl or 1-sulpho-2-carboxyethyl.

22. A photographic developing composition according to claim 18, wherein m is 1 and A is carboxyphenyl or sulphophenyl.

23. A photographic developing composition according to claim 18, wherein m is 0 and A is 3-sulphopropyl or 2-hydroxy-3-sulphopropyl.

24. A photographic developing composition according to claim 18, comprising hydroquinone as the sole silver halide developing agent, and formaldehyde bisulphite.

* * * * *